(12) United States Patent
Samadi

(10) Patent No.: US 10,644,979 B2
(45) Date of Patent: May 5, 2020

(54) TELECOMMUNICATIONS NETWORK TRAFFIC METRICS EVALUATION AND PREDICTION

(71) Applicant: The Joan and Irwin Jacobs Technion-Cornell Institute, New York, NY (US)

(72) Inventor: Payman Samadi, New York, NY (US)

(73) Assignee: The Joan and Irwin Jacobs Technion-Cornell Institute, New York, NY (US)

( * ) Notice: Subject to any disclaimer, the term of this patent is extended or adjusted under 35 U.S.C. 154(b) by 0 days.

(21) Appl. No.: 16/433,434

(22) Filed: Jun. 6, 2019

(65) Prior Publication Data

US 2019/0379592 A1 Dec. 12, 2019

Related U.S. Application Data

(60) Provisional application No. 62/681,371, filed on Jun. 6, 2018.

(51) Int. Cl.
*G06F 15/173* (2006.01)
*H04L 12/26* (2006.01)
*H04W 4/021* (2018.01)

(52) U.S. Cl.
CPC ........ *H04L 43/0882* (2013.01); *H04L 43/045* (2013.01); *H04L 43/062* (2013.01); *H04L 43/0852* (2013.01); *H04L 43/14* (2013.01); *H04W 4/021* (2013.01)

(58) Field of Classification Search
CPC .................................................. H04L 43/0882

USPC .......................................................... 709/224
See application file for complete search history.

(56) References Cited

U.S. PATENT DOCUMENTS

| | | | |
|---|---|---|---|
| 7,831,532 B2* | 11/2010 | Horvitz | G01C 21/36 706/45 |
| 8,954,567 B1* | 2/2015 | Skvortsov | H04N 21/24 709/224 |
| 9,219,592 B1 | 12/2015 | Nichols et al. | |
| 9,342,790 B1* | 5/2016 | Baughman | G06N 5/043 |
| 10,200,267 B2* | 2/2019 | Zafer | H04L 41/142 |
| 2006/0047807 A1* | 3/2006 | Magnaghi | H04L 41/0677 709/224 |

(Continued)

FOREIGN PATENT DOCUMENTS

EP 2701344 A1 2/2014

OTHER PUBLICATIONS

International Search Report and Written Opinion for International Application No. PCT/US2019/035798, dated Aug. 19, 2019, 11 pages.

*Primary Examiner* — Anthony Mejia
(74) *Attorney, Agent, or Firm* — Cooley LLP

(57) ABSTRACT

A method for evaluating and predicting telecommunications network traffic includes receiving site data for multiple geographic areas via a processor. The processor also receives weather data, event data, and population demographic data for the geographic areas. The processor also generates predicted occupancy data for each of the geographic areas and for multiple time intervals. The processor also determines a predicted telecommunications network metric for each of the geographic areas and for each of the time intervals, based on the predicted occupancy data.

10 Claims, 6 Drawing Sheets

(56) References Cited

U.S. PATENT DOCUMENTS

| | | | |
|---|---|---|---|
| 2010/0082800 A1* | 4/2010 | Wei | H04L 51/12 709/224 |
| 2012/0023226 A1* | 1/2012 | Petersen | H04W 4/18 709/224 |
| 2013/0311650 A1* | 11/2013 | Brandwine | H04L 43/04 709/224 |
| 2014/0108640 A1 | 4/2014 | Mathis | |
| 2015/0288573 A1 | 10/2015 | Baughman et al. | |
| 2016/0014468 A1* | 1/2016 | Dadheech | H04N 21/6338 725/14 |
| 2016/0217022 A1 | 7/2016 | Vellpasaoglu et al. | |
| 2016/0285700 A1 | 9/2016 | Gopalakrishnan et al. | |
| 2018/0063002 A1* | 3/2018 | Filley | G06Q 50/30 |
| 2019/0180612 A1* | 6/2019 | Demiryurek | G06N 20/00 |

* cited by examiner

TELECOMMUNICATIONS NETWORK TRAFFIC METRICS EVALUATION AND PREDICTION

CROSS-REFERENCE TO RELATED APPLICATIONS

This application claims priority to and the benefit of U.S. Provisional Patent Application Ser. No. 62/681,371, filed Jun. 6, 2018 and titled "Telecommunications Network Traffic Metrics Evaluation and Prediction," the disclosure of which is hereby incorporated by reference in its entirety.

FIELD

The present disclosure relates to the field of telecommunications network planning, management, and operation.

BACKGROUND

There are 336 cities in the world with populations that exceed 1 million, and 75% of the world's population will live in urban areas by the year 2050. In such cities, there can be large daily migrations of the cities' inhabitants. For example, in the U.S. alone, there are 20 cities in which more than 50% of the inhabitants commute or otherwise move within the city on a typical day. With the proliferation of consumer software applications having varying bandwidth and latency specifications, the demand on associated communications networks can vary significantly with fluctuations in the number of active users and the type of applications being used.

SUMMARY

Embodiments of the present disclosure facilitate the forecasting of variations in telecommunications traffic (e.g., relative to a reference/base level of expected telecommunications activity for a specified time, date and/or location, or average usage for a specified time), for example in densely populated areas and/or in areas having significant daily migrations of people. In some such implementations, external data and machine learning techniques are used to predict spikes in, and/or sudden changes on, telecommunications network traffic demand. Alternatively or in addition to forecasting/predicting telecommunications traffic variation and/or telecommunications traffic demand, systems and methods of the present disclosure can facilitate the forecasting of telecommunications network metrics such as (but not limited to): a type of traffic, an amount of traffic, a volume of traffic, a network latency, a packet drop, traffic variation compared to a reference point (relative), Such forecasts/predictions can be provided to one or more operators (e.g., via a graphical user interface (GUI)), who may use such insights to 1) improve their network resource allocation to increase network performance, 2) improve energy efficiency by decreasing unused network resources, and/or 3) perform short-term and long-term network capacity planning. Alternatively or in addition, systems and methods of the present disclosure can be used to generate recommendations, for presentation to operators (e.g., via the GUI), based on the forecasts/predictions generated by the system. Recommendations can include one or more of: network architecture modification recommendations, network traffic routing modifications, network capacity planning recommendations, network equipment modification/replacement recommendations, etc.

In some embodiments, a method for evaluating and predicting telecommunications network traffic includes receiving site data for multiple geographic areas via a processor. The processor also receives one or more of: event data, historical data, predictive data (e.g., relating to weather and/or traffic), live data (e.g., relating to social media data and/or transportation services), and static data (e.g., relating to population demographic data, number of businesses and/or venue capacity) for the geographic areas. The processor also generates predicted occupancy data for each of the geographic areas and for multiple time intervals. The processor also determines a predicted telecommunications network metric for each of the geographic areas and for each of the time intervals, based on the predicted occupancy data. The method can also include generating, via the processor and for each geographic area of the plurality of geographic areas and for each time interval of a plurality of time intervals, predicted activity category data, and the determining the predicted telecommunications network metric can further be based on the predicted activity category data. Alternatively or in addition, the method can also include receiving: (1) an indication of a first geographic area of the plurality of geographic areas and (2) an indication of a first time interval of the plurality of time intervals, via a graphical user interface (GUI), and sending a signal to cause display, within the GUI, of the predicted telecommunications network metric associated with the first geographic area and the first time interval, in response to receiving the indication of the first geographic area of the plurality of geographic areas and the indication of the first time interval of the plurality of time intervals. Generating the predicted occupancy data can be based on the site data, the weather data, the event data, and/or the population demographic data. The site data can include site occupancy capacity data.

In some embodiments, a method for evaluating and predicting telecommunications network traffic includes receiving site data for a predetermined geographic area and event data for the predetermined geographic area via a processor. The processor generates a predicted telecommunications traffic metric, for the predetermined geographic area and for a predetermined time interval, based on the site data and the event data. The processor can send a signal, for example using an application programming interface (API) and/or a comma-separated values (CSV) file, to cause display of the predicted telecommunications traffic metric via the GUI, for example in response to receiving an indication of the predetermined geographic area and an indication of the predetermined time interval via a graphical user interface (GUI). The predicted telecommunications traffic metric can include a predicted traffic volume and an associated traffic type. The event data can include movement data associated with an individual. The method can also include sending a signal (e.g., via the API and/including transmission of a CSV file) to cause display of a map including the predetermined geographic area within the GUI.

In some embodiments, a method for predicting resource demand includes receiving, via a processor, event data for a geographic area. The method also includes receiving capacity data for a venue within the geographic area, and determining a population volume time series based on the event data and the capacity data. The method also includes receiving historical data associated with the geographic area, and determining a relativized population volume time series based on the population volume time series and the historical data. A resource demand for the geographic area is then predicted based on the relativized population volume time series.

DETAILED DESCRIPTION

Figure 1:
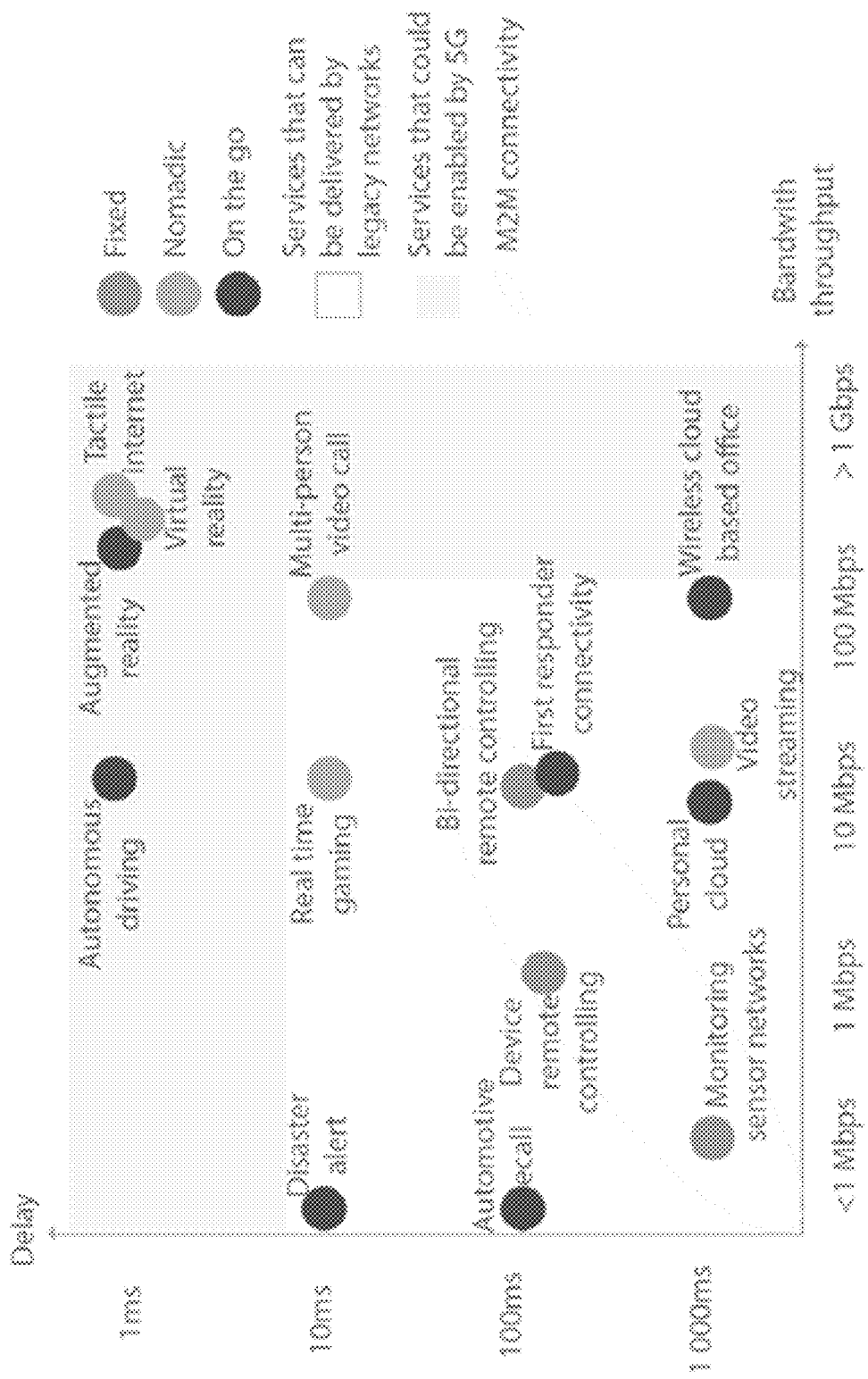
FIG. 1 is a plot of performance characteristics for a variety of telecommunications applications.

In urban areas, people move/travel along routes that can correspond to or be associated with any of a wide variety of activities and/or objectives. Depending on the location, time, and type of activity, an individual can seek any of a wide range of services or resources including (but not limited to) wireless network (e.g., Mobile, WiFi®, etc.) connectivity, transportation, energy/power, food/drink, emergency services, safety, etc. As demand for such services changes, providers of those services may need time to make adjustments to their supply chain, leading to inefficiencies in delivery of the services. Known methods of urban resource allocation are typically based on demand forecasts generated using historical data. Such approaches, however, rely on limited data that lacks context, and produce low-accuracy, averaged-out predictions that do not facilitate differentiation between anomalous and spontaneous real-world behavior. As a result, there is generally a gap between actual, "real world" demand and forecast demand for a given business vertical. To address this gap, embodiments set forth herein provide an improved-accuracy, flexible demand prediction and optimization platform that takes into account population, location, and predicted activity and/or route of traversal (i.e., the path along which an individual walks or drives). System-level implementations of the present disclosure can include a knowledge-base; a memory storing processor-executable steps such as extraction, transformation, enhancement, and loading of data; multiple different machine learning algorithms and/or optimization algorithms; and an intuitive data delivery platform. Systems set forth herein can be specifically designed to comply with applicable U.S. and EU data privacy laws. In some embodiments, the system can generate recommended actions and/or remediation measures in response to predicting a high demand (e.g., above a predetermined threshold demand). Recommended actions and remediation measures can include, but are not limited to, one or more of: reallocation of resources (e.g., network resources, computing resources, etc.), restriction of already-allocated resources (e.g., network resources, computing resources, etc.), re-prioritization of already-allocated resources (e.g., network resources, computing resources, etc.), addition of resources (e.g., network resources, computing resources, etc.), alerting/notifying one or more users, etc.

For telecommunications network operators, satisfying the Quality of Service (QoS) promised to their customers is crucial. Conventionally, operators try to add as much capacity as possible to their networks, to be able to handle an anticipated worst-case scenario. Such strategies, however, are expensive, energy inefficient, performance inefficient, not scalable in larger cities, and not sustainable for 5G systems. The adoption of virtualized networks and the ability to dynamically add/remove network and compute resources, has made it possible to improve this strategy by implementing a more dynamic network resource allocation. Networks are often designed and managed "application blind," i.e., network operators only have access to Layers 0-3 of the network, and thus are unable to access software application information. Furthermore, due to customer privacy concerns, network operators typically cannot collect data from individuals on their mobile activity. As such, it is difficult for operators to forecast how network users at a large scale will use the network and how much resources they will need.

Attempts at predicting demand using historical layer 0-3 trend data have often produced low accuracy predictions, for example since (1) aggregated traffic information drastically varies based on the application used by a majority of customers, (2) trend analysis techniques using aggregated network usage typically cannot predict spikes and sudden variations, and/or (3) there are new applications that are continuously being introduced into the network(s) with differing bandwidth and latency requirements, for which historical data may not exist. This lack of data on network user behavior can result in inefficient networks and/or a poor user experience. Moreover, the issues of variation and unpredictability in network demand may be exacerbated by the introduction of 5G wireless systems, since 5G will accommodate new sets of applications that can span up to 4 orders of magnitude difference in bandwidth and latency requirements, as shown in the plot of FIG. 1. More specifically, FIG. 1 is a plot of performance characteristics (typical bandwidth throughput and communications delay) for a variety of telecommunications applications, such as monitoring sensor networks, virtual reality, augmented reality, bidirectional remote controlling, autonomous driving and video streaming. This application-based variability in network application usage can overburden the network, leading to performance problems.

Embodiments of the present disclosure can be used to improve the allocation of network systems, by more accurately forecasting/predicting demand for such resources. Such forecasts/predictions can be generated based on population data, location data, and/or predicted activity and/or route of traversal, together with one or more machine learning models trained over one or multiple industry verticals. Examples of industry verticals for which demand can be predicted include, by way of non-limiting example: transportation (such as ride hailing and public transportation), mobile telecommunications, mobile internet, food and beverage, emergency services (such as police, firefighter, paramedics, ambulance, and public safety services), and retail (e.g., sale of merchandise). Models set forth herein can be autonomous in nature (i.e., self-training) and/or can be configured to generate "first impression" demand forecasts/predictions for new markets for which no trained model yet exists. Alternatively or in addition, models set forth herein can be configured to predict correlations between real-world phenomena and various business demands. Real-world phenomena can include city events such as conferences, trade shows, exhibitions, sporting events, transportation delays/shutdowns, weather events, etc. Business demands that can be impacted by the real-world phenomena include, by way of non-limiting example, mobile internet services, transportations services, public safety resources, emergency services, food and beverage demand/sales, and/or merchandise demand/sales.

In some embodiments of the present disclosure, a system for more effectively and/or efficiently evaluating and predicting telecommunications network traffic includes a software platform configured for use by an operator of a telecommunications network. The system can be implemented in a computing device, and may be disposed within a premises of the network operator or made accessible to the network operator via a cloud computing network ("the cloud"). The system can be accessible, for example, via a user interface that may be graphic or text-based and/or via API.

Embodiments of the present disclosure can provide benefits to telecommunications network operators as well as other actors (such as end-users of the network). For example, in some implementations, information used by the system to generate network performance predictions are obtained through available public or statistical resources without violating a network user's privacy. Systems set forth herein can provide telecommunications operators with unique access to data about their customers/users that can greatly enhance their operation and business. For example, by predicting large spikes and variations in network usage, systems of the present disclosure make it possible for network operators to proactively tune and optimize their network performance to meet their QoS targets during such events, and/or to improve energy efficiency by decreasing network resources when they are not needed (e.g., putting small-cell base stations on standby to reduce energy usage). Knowledge about time/location-specific traffic increase and decrease trends can allow telecommunications operators to improve their short-term and long-term capacity planning and improve return on capital investments. Using systems and methods set forth herein, network operators can also assess their network performance and perform risk analysis, for example by monitoring (e.g., using the information layers described herein) variations in network usage, changes in weather conditions, electricity shortages and/or construction events. Based on these information, the invention can predict outage type, location and time.

Embodiments set forth herein include a prediction and optimization platform that combines a knowledge base (e.g., including population location and activity data) with customer and domain-specific data to perform high accuracy prediction across various business verticals or domains. The platform leverages a collection/set or "portfolio" of trained machine learning models configured to perform spatial and temporal predictions over any domain that is impacted by population location and activity. The platform can identify correlations among multiple different business resource demands, external phenomena, and future trends, and can respond to anomalous behaviors/event that could not be predicted/forecasted using a machine learning model for a single business domain alone.

Knowledge Base

Urban areas can be uniquely identified based on one or more of a wide variety of characteristics, including, for example, neighborhood, architecture, history, seasonal activities, and culture of the inhabitants. However, there can also be significant similarities among the cities, countries, or continents in which people gather, and among the activities those people engage in. Systems set forth herein can include a self-evolving knowledge-base (e.g., an autonomous machine learning model) that can detect and capture/store unique characteristics of urban areas, for example characteristics related to population, location, predicted activity and/or predicted activity category. Examples of activity categories that can be predicted include, but are not limited to: internet activities, transportation activities (e.g., vehicular traffic), wireless network communications related activities, energy/power related activities, social activities, emergency services related activities, safety-related activities, etc. The knowledge-base is an automated, highly accurate, cost-effective, dynamic, secure, and easily scalable platform that continuously collects data from various sources in the following categories, optionally for each of multiple urban centers:

Event data: Data associated with organized events including sporting events, concerts, parties, conferences, workshops, cinemas, tradeshows, meetups, etc.

Historical data: Historical visitor statistics (e.g., attendance) for areas of interest such as: bars, cafés, night clubs, hospitals, airports, train stations, etc., for example as associated with a particular day of the year, season, date, etc.

Predictive data: Weather data, traffic data, etc.

Live data: Social Media data, transportation data, etc.

Static data: number of businesses within a specified geographic region, types of businesses within a specified geographic region, demographic data, etc.

Extract, Transform, Enhance, and Load Platform

In some embodiments, a processor-implemented system can leverage one or more big data tools (such as Apache Spark or Postgres Database) to extract one or more large data sets (e.g., data sets having a size of at least about 1 gigabyte (GB) or between about 1 GB and about 1 terabyte (TB) from its knowledge-base (also referred to herein as a "data warehouse"), for example via an automated process. Upon extraction of the large dataset(s) from the data warehouse, the data from the large dataset(s) can be transformed from a first format into one or more new formats and modified/enhanced such that it includes one or more new features (i.e., a "feature enhancement" process), thereby producing a transformed dataset. The feature enhancement processes can include a predetermined sequenced set of multiple supervised machine learning algorithms and/or unsupervised machine learning algorithms to achieve high prediction accuracy, for example across multiple different business applications (e.g., large-scale performances, political events, sport events, city parades, national holidays, social events, tradeshows, exhibitions, conferences, etc.). Three examples of such models are:

Category Classifiers:

Information/data associated with historical organized events can be gathered from various sources, however, not all such information/data is categorized at the source. In some embodiments of the present disclosure, an event classifier platform (implemented in software and/or hardware) includes or uses one or more Natural Language Processing (NLP) models. NLP models classify each event within an associated category, and the association between the classified events and their designated categories can be stored (e.g., in a table) in memory. Event classification can serve to improve the prediction accuracy of one or multiple different business applications, for example by providing inter-operability within the knowledge-base.

Duration Estimators:

In some embodiments, machine learning is used to detect correlations between a pattern of increase or decrease to population or population density, and one or more organized events. One or more of multiple different factors, such as event type, event category, event location, etc. can impact the amount of change and/or rate of change in population or population density around a given venue. Machine learning models of the present disclosure can use stochastic analysis and optimization to precisely estimate the timing and duration of one or more peaks/spikes in population change around each of multiple venues/neighborhoods, thus providing useful data as input to one or more business applications.

Attendance/Capacity Estimator:

In some embodiments, machine learning algorithms and big-data tools are used to maintain an accurate measurement of maximum capacity and expected attendance over time for any of a wide range of venues and events. These measurements can then be used/implemented in the accurate prediction of population density flux in areas hosting both organized events and non-organized events.

Once the feature enhancement process has completed, and the transformed dataset has been generated, it can be loaded onto a low latency, scalable, high-availability database. As used herein, "high-availability" refers to a characteristic of a database or other system that a measurable level of operational performance thereof (e.g., uptime or other service metric) remains consistent over a period of time that is longer than has historically been sustained. High-availability can mean the condition of being operational at least about 99.999% of the time, or at least about 99.995%, or at least about 99.99%, or at least about 99.9%, or at least about 99.8%, or at least about 99.5%, or at least about 99%, or at least about 98%, or at least about 97%, or at least about 95%, or at least about 90%, or at least about 55.5555555%. This database can serve as a foundation for providing key insights across several business applications using the predictive models discussed below.

Predictive Models for Diverse Set of Domains

Prediction platform technology systems (PPTs) set forth herein can be used to predict (and, hence, plan for) resource demand that varies (whether in predictable/foreseeable ways or unexpectedly) with time and location. The PPTs can provide such predictions across a wide-range of business verticals (or "domains") through a portfolio of trained models using system data and/or customer data. Depending upon the implementation, PPT embodiments set forth herein can perform one or more of:

Prediction of resource demand in new domains for which no trained models exist: Predictive methods can be based on deeply correlated data, for example related to population location and/or activities in urban areas, which often directly impact businesses and industries (e.g., sales traffic, revenue, etc.). Once initial models have been trained and established, predictions and associated insights can be generated across a wide range of industries. In addition, each particular prediction can be used to inform at least one further prediction for a related variable/value. For example, trained models for predicting demand for transportation and network connectivity in urban regions for specified timeframes, and/or the output of such trained models, can be used to perform predictions of demand for food demand/supply, demand for staffing, demand for emergency services, demand for energy, etc. Each time a model is used to make predictions for a new industry domain, the accuracy of the statistical inference capability of that model can improve (e.g., via feedback from or integration with model data from another and/or retraining based on ground truths) without forcing an unsustainable or dramatic increase in that model's complexity. Over time, a set of multiple domain-specific predictive models can be compiled such that, when used in the aggregate, their collective predictive power and accuracy (and/or the predictive power and accuracy of each domain-specific model) are synergistically improved. An example method for predicting resource demand is shown in, and described with reference to, FIG. 4.

Correlation of phenomena across business applications: Using multiple different domain-specific predictive models (e.g., covering multiple different business applications), correlations can be detected or calculated between a given phenomenon or event (e.g., a number, type and/or category of event(s) within a specified period of time) and business applications, thus facilitating the improved prediction of increases/decreases in future performance (e.g., supply, demand, revenue, traffic, etc.) of the business applications. As such, correlations between, for example a number of events (e.g., sports events) and a particular resource demand, or between weather and resource demand, or between traffic and demand can be determined/detected. The multiple different domain-specific predictive models can be combined with locally-stored location data and/or activity data to perform prediction across domains for behavior that otherwise would seem anomalous and unpredictable from within each isolated domain. In other words, sudden changes in population movement that may be classified as anomalous by a machine learning algorithm trained within a specific industry domain alone, may instead be recognized as expected (e.g., seasonal) by a composite/combined statistical model generated based on models for each of a plurality of different business/industry verticals (or domains), such as transportation and networking.

In some embodiments set forth herein, a system for generating predictions/forecasts (e.g., of resource demand) includes multiple supervised machine learning models each configured to generate predictions/forecasts for an associated business/industry vertical or domain, Inputs to the machine learning models can include customer data. In some implementations, multiple different machine learning models (some or all of which may be operating in parallel) are used as predictors (optionally in combination with or based on customer historical data and/or external contextual data) for new demand forecasting models (which also optionally take into account the customer historical data and/or external contextual data). Algorithms of the machine learning models can include (but are not limited thereto) one or more regression models and/or one or more neural networks, such as feed-forward neural networks, convolutional neural networks (CNNs), artificial recurrent neural networks such as long short-term memory (LSTM), etc. In some implementations, each domain-specific supervised machine learning model uses a different machine learning algorithm, or the machine learning algorithm for each domain-specific supervised machine learning model is selected based on the associated domain.

Business Optimization Platform

In some embodiments, in addition to generating accurate predictions/forecasts of resource demand, systems of the present disclosure can also generate, as outputs, recommended actions for adapting a supply chain to adapt to or accommodate temporal and/or spatial demand variations. Each business application can have numerical and implementation attributes that differ from the numerical and implementation attributes of other business applications. Examples of numerical and implementation attributes include, but are not limited to: bandwidth size, positioning, and/or adjustments thereto (e.g., in the context of telecommunications networks), fleet size, such as number of vehicles/cars and adjustments thereto (e.g., in the context of transportation), number of employees, equipment and/or vehicles, and adjustments thereto (e.g., in the contexts of police, paramedic, ambulances, and emergency rooms), and quantity of line items (e.g., for food in the contexts of restaurants and grocery stores).

A Fundamental Optimization Problem

Although the implementation of optimization actions can differ across businesses or business applications, the mathematics underlying such optimization actions can be categorized as either single-objective or multi-objective stochastic optimization. For example, businesses that rely on population density flux can face similar stochastic optimization problems, and as such, similar solutions can be drawn from a range of queueing and scheduling models related to operations research and resource allocation. Business solutions from the area of operations research can fall into one or more of three categories: stochastic batch scheduling, multi-armed bandit scheduling, and queueing systems scheduling. Depending on the particular business application and attributes of that business application, a machine learning model can be selected and implemented, for example based on associated measures of fitness to the real-world situation and/or accuracy (which may be informed by historical data). Resource allocation solutions to population density flux problems can take the form of one or more mixed-integer programming models (with optimization under linear and bounded constraints, for example) and/or solutions to various forms of the Knapsack problem in combinatorics.

The accuracy of massive-scale or large-scale optimization problems involving the location and activities of large populations can suffer from incomplete information. Knowledge bases set forth herein, however, provide a solution to information completeness issues, since underlying stochastic scheduling is performed via a Bayesian inference process that updates some or all probability hypotheses as additional information is received or becomes available via an data input stream. Illustrative examples for two massive-scale markets, mobile networks and ride-hailing, are presented below.

Mobile Networks

Mobile networks typically include a front-end (for radio and signal processing) and a backend (for network routing and connectivity to data centers). Front-ends of 5G network equipment can be adjusted, improved or optimized by leveraging the Cloud and/or via virtualization of Radio Access Networks (RANs). In next generation of RANs, a pool of resources including Base Band Units (BBUs) are provided to a range of microcells that support 3D Beamforming and Massive multiple-input and multiple-output (MIMO). Optimizing resource allocation in such pools of resources can help to ensure high performance and cost-effective operation of 5G.

In the backend, Software Defined Networks (SDNs) are known communication routes/paths that can transmit customer data to data centers. Improving or optimizing distribution of the traffic over the available SDN paths can significantly reduce transmission times and delays, which could have significant benefits for a wide variety of 5G applications such as virtual reality (VR), augmented reality (AR), self-driving cars, telemedicine, critical internet-of-things (IoT), etc. The underlying models for achieving such improvements/optimizations of traffic distribution can be part of the operations research and resource allocation domains described herein. Mobile networks can use Multi-class Queueing Networks (MQNs) for the scheduling of queueing systems in which the tasks/jobs to be completed arrive at varying and/or random time intervals. Systems of the present disclosure can generate predictions and recommended actions not only the scheduling of such randomly arriving tasks/jobs, but also for jobs whose completion time as well as cost rate incurred per unit time are randomly distributed, such as can arise in the context of ride-hailing systems (discussed below). In view of the large capital and operational investment that are typically employed by organizations for network infrastructure and its operation, significant benefits can be achieved by even modest improvements in the reallocation of idle and unused resources throughout the mobile network.

Ride-Hailing Systems

Ride-hailing companies can impose adjustments to their supply chains by, for example: 1. providing driver incentives, which can be temporal incentives and/or spatial incentives, to change the fleet size and/or to move the fleet, and 2. adjusting passenger pricing such that it is dependent on the time of arrival. Global optimization/accommodation of ride-hailing demand can be achieved by the multi-domain machine learning systems set forth herein, through the generation of recommended action relating to driver incentives and/or passenger pricing adjustments, to increase car/taxi availability and, consequently, ride-hailing revenue.

Intuitive Data Delivery Platform

In some embodiments, a system includes a platform (implemented in hardware and/or software) that can service multiple different domains using user interfaces (e.g., graphical user interfaces (GUIs)) and endpoint application programming interfaces (APIs). The platform can identify key characteristics of customer prediction requests and/or customer data, for example, via a survey (which may be presented to a user, e.g., via the GUI, and/or sent to a user via the API and/or sent in the form of a CSV file). In the backend of the system, data cleaning and feature enhancement can be performed, and the type of external data, trained models, and machine learning (ML) algorithms can be detected/identified that will provide the highest achievable accuracy prediction in that domain.

Figure 2:
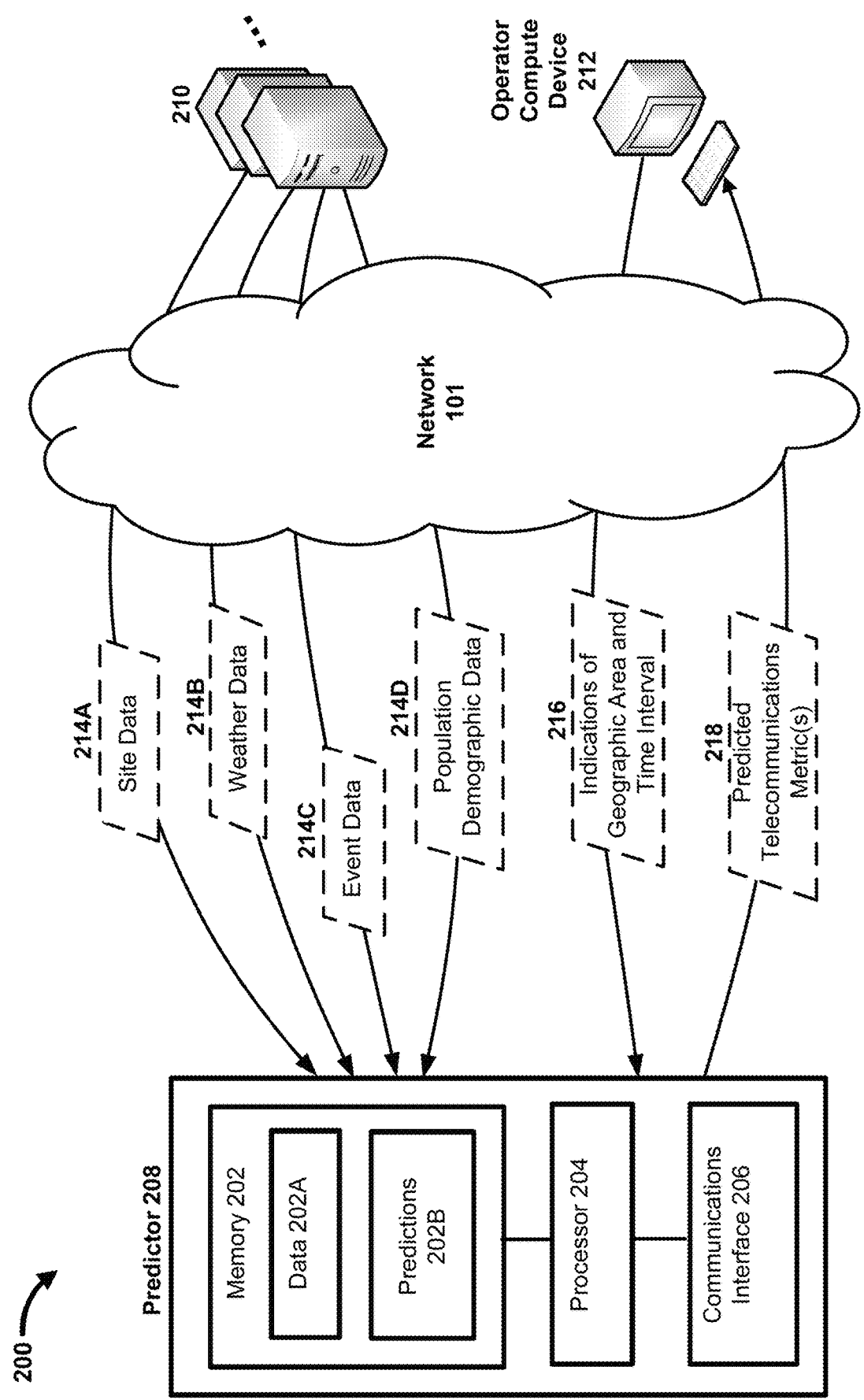
FIG. 2 is a system diagram showing components of a system for evaluating and predicting telecommunications network traffic, according to some embodiments.

FIG. 2 is a system diagram showing components of a system 200 for evaluating and predicting telecommunications network traffic, according to some embodiments. The system 200 includes a predictor 208 in network communication (e.g., via wireless network 101) with one or more compute devices 210 (e.g., third-party servers, etc.) and one or more operator compute devices 212. The predictor 208 includes a memory 202 operably coupled to a processor 204, and the processor 204 is operably coupled to a communications interface 206. The memory 202 stores data 202A and predictions 202B. The data 202A can include, for example, data received from the one or more compute devices 210 (e.g., via wireless network 101), for example one or more of: site data 214A, weather data 214B, event data 214C, and population demographic data 214D. Site data 214A can include, but is not limited to, one or more of: property layout data, facility type data, facility size data, facility usage data, actual site occupancy data, and site maximum occupancy data. Weather data 214B can include, but is not limited to, one or more of: temperature, weather description (sunny, cloudy, partly sunny, partly cloudy, mostly sunny, mostly cloudy), wind, barometric pressure, precipitation, and humidity. Event data 214C can include, but is not limited to, one or more of: individual movement data (e.g., GPS location data), event type data, event duration data, event attendance forecast data, and actual event attendance data. Population demographic data 214D can include, but is not limited to, one or more of: age data, income data, gender data, predicted device type data, profession data, educational level data and social media usage data. Each of site data 214A, weather data 214B, event data 214C, and population demographic data 214D can include data that is specific to a predetermined/specified geographic location and/or specific to a predetermined/specified day, date, time, and/or time interval.

The processor 204 can access data 202A and generate predictions 202B associated with one or more telecommunications network metrics based on the retrieved data 202A. Examples of telecommunications network metrics that can be predicted by the processor 204 of the predictor 208 can include, but are not limited to, one or more of: total traffic volume for a predetermined time interval, traffic type, and traffic volume per unit time, total bandwidth variation for a predetermined time interval, and latency distribution for a predetermined time interval.

The predictor 208 can receive, e.g., via its communications interface 206, a message from an operator compute device 212 (e.g., via wireless network 101) including an indication of a geographic area and/or an indication of a time interval of interest (216). In response to receiving the message 216, the predictor 208 (e.g., via processor 204) can perform a lookup or otherwise retrieve (e.g., from memory 202) one or more predicted telecommunications metrics associated with the indication of a geographic area and/or the indication of a time interval of interest (216), and send the one or more predicted telecommunications metrics via a message (218) to the operator compute device 212.

In some implementations, data stored in the memory 202 includes multiple (e.g., 3) layers of data/information, for example organized as follows:

1. A Location Layer can include a dynamic "map" (e.g., defined within a grid) that can automatically adapt itself to a change in network architecture and/or to the demands of a user/operator. For elements of the map (e.g., meshes of the grid), data associated with multiple types of buildings and/or streets (e.g., Building Directory data, International Building Code (IPC) data, etc.) can be received or "gathered" from one or more data providers. For each building and/or location, a maximum occupancy capacity, in terms of people and/or number of devices that can be connected to a network, can be determined.

2. A Human/Activity Layer can include data such as a number of occupants per unit time and/or per activity (future projected and/or actual historical). The data can be gathered using one or more of: internet crawling. Public APIs (such as Google Places API, Facebook events API, etc.), or human activity apps APIs (e.g., health-related apps). Once datasets for multiple different categories of building or other location type have been gathered, a machine learning engine is built for each category, and trained, for example, using the following inputs to generate outputs:

Inputs:
  1. Weather:
    a. Temperature
    b. Wind
    c. Clear/Rain/snow
  2. Event category -continued 3. Human archetype
    a. Age
  4. Time info:
    a. Hour
    b. Day of the week
    c. Month
Outputs:
  1. Number of occupants
  2. Activity category type 3. A Network Layer can include network usage data for each location and time, generated based on the outputs from Layer 2 (i.e., the associated numbers of occupants and activity category types). The Network Layer can be said to have a "knowledge base" that includes statistical information related to network usage for different activities, such as voice, browsing, video streaming, gaming, virtual reality, etc. The knowledge base can be generated using data provided by one or more mobile network performance systems and/or existing statistical models. For example, using one or more datasets of the knowledge base, a machine learning engine can be trained to predict network usage for each location and time, using the following inputs to generate outputs:

Inputs:
  1. Number of occupants
  2. Location category
  3. Activity category
Outputs:
  1. Network usage
    a. Voice
    b. Backup
    c. Game
    d. Video streaming
  2. Network usage
    a. Bandwidth
    b. Latency In some embodiments, by combining the foregoing layers of data/information, a system of the present disclosure can provide real-time data, using real-time data and/or prediction data and trained machine learning engines. Machine learning engine implementations can include, but are not limited to: regressions, classifications, neural networks, and Hidden Markov models. In other embodiments, predictions can be generated and provided by the system exclusively using real API data, without the use of machine learning models.

Figure 3:
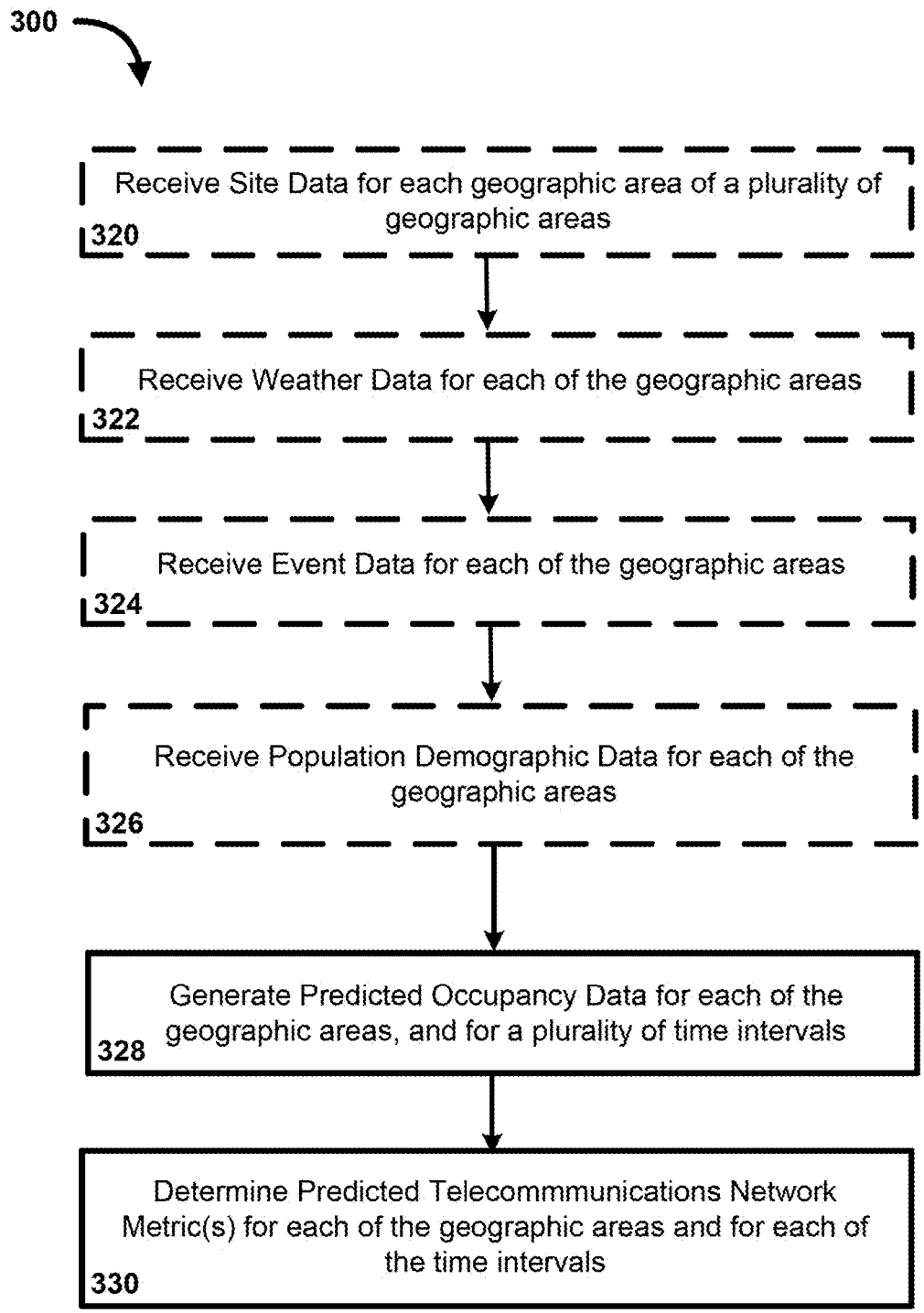
FIG. 3 is a process flow diagram illustrating a method for evaluating and predicting telecommunications network traffic, according to some embodiments.

FIG. 3 is a process flow diagram illustrating a method 300 for evaluating and predicting telecommunications network traffic, compatible with the system 200 of FIG. 2, according to some embodiments. As shown in FIG. 3, the method 300 begins upon receipt (e.g., at a processor such as processor 204 of FIG. 2) of one or more of: site data for each geographic area of a plurality of geographic areas (at 320), weather data for each geographic area of a plurality of geographic areas (at 322), event data for each geographic area of a plurality of geographic areas (at 324), or population demographic data for each geographic area of a plurality of geographic areas (at 326). At 328, predicted occupancy data is generated for (1) each of the geographic areas, (2) for a plurality of time intervals, for example based on the received one or more of site data, weather data, event data, or population demographic data. Based on the predicted occupancy data, one or more predicted telecommunications network metrics are determined for (1) each of the geographic areas, (2) for a plurality of time intervals. In some implementations (not shown), the method 300 can further include generating recommendations, for presentation (e.g., via a GUI) to one or more network operators (sent, for example, via an API and/or in the form of a CSV file), based on the one or more predicted telecommunications network metrics.

Figure 4:
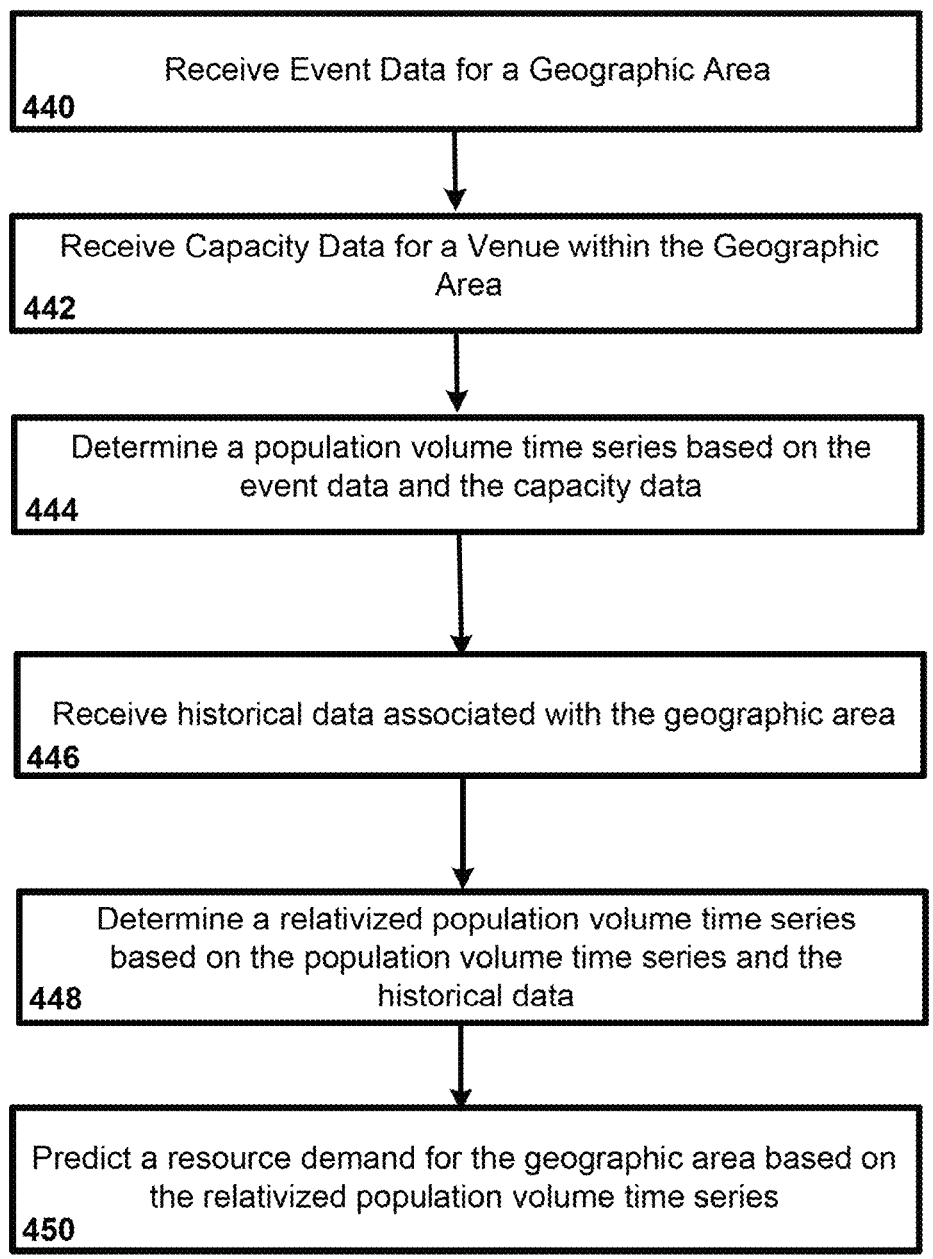
FIG. 4 is a process flow diagram illustrating a method for predicting resource demand.

FIG. 4 is a process flow diagram illustrating a method 400 for predicting resource demand. As shown in FIG. 4, event data for a geographic area or region is received, via a processor (such as processor 204 of FIG. 2), at 440. At 442, capacity data for a venue within the geographic area is received via the processor. A population volume time series is generated/determined at 444, based on the event data and the capacity data. At 446, historical data associated with the geographic area is received via the processor. A relativized population volume time series is determined based on the population volume time series and the historical data, at 448. Then, at 450, a resource demand is predicted for the geographic area based on the relativized population volume time series. Any of the steps of method 400 can be performed via, or include an interaction with, a GUI, an application programming interface (API) and/or a comma-separated values (CSV) file.

Figure 5A:
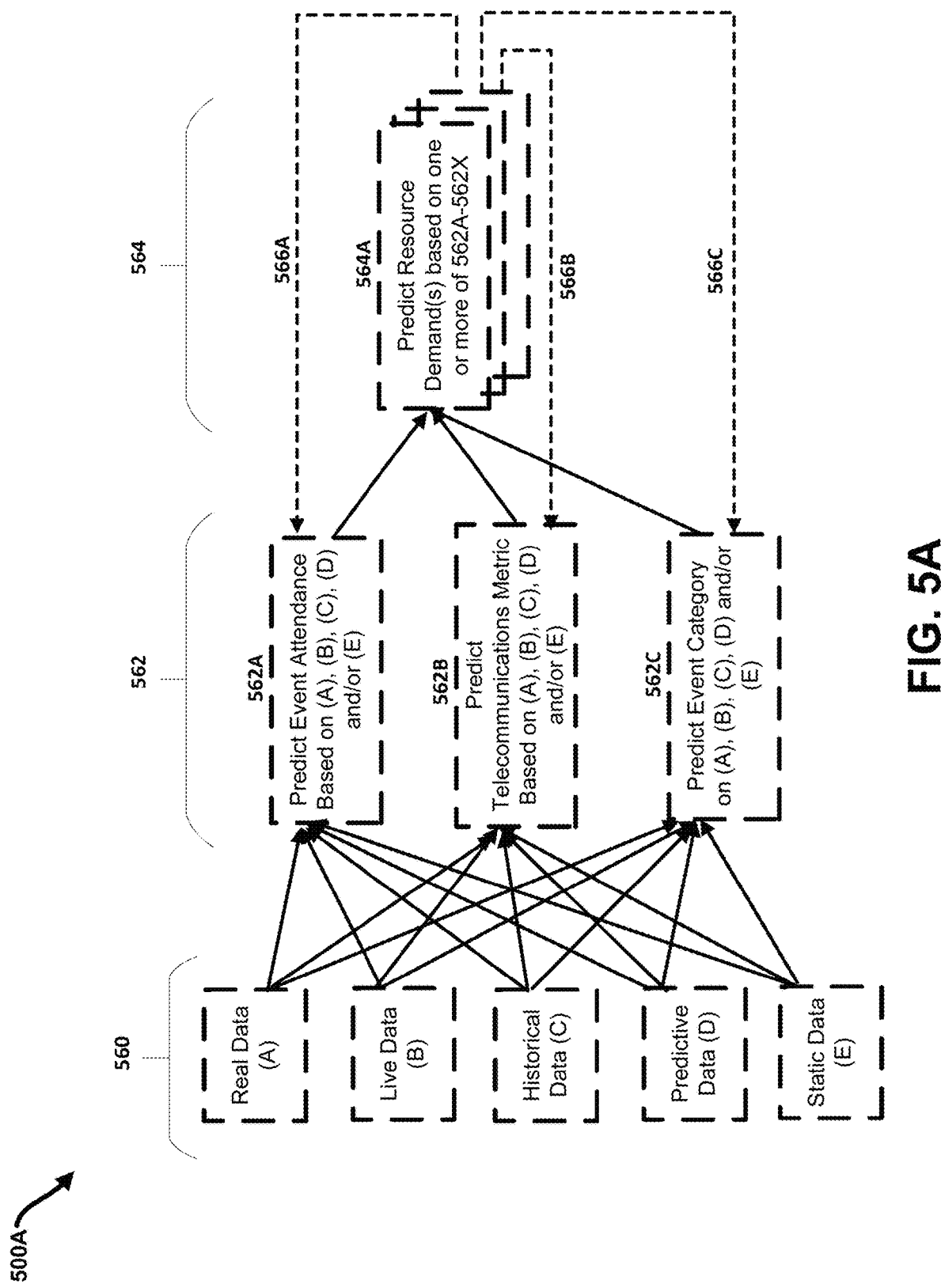
FIG. 5A is a process flow diagram for a resource prediction system, according to some embodiments.

FIG. 5A is a process flow diagram for a resource prediction system, according to some embodiments. As shown in FIG. 5A, the process 500A includes receiving data, at 560, from one or all of multiple sources (A) through (E), including one or more of: real data (A), live data (B), historical data (C), predictive data (D), and static data (E). At 562, an intermediate, first prediction stage occurs, in which one or more of the inputs (A) through (E) received at 560 are used to predict values such as event attendance (562A), one or more telecommunications metrics (562B), and one or more event categories (562C). The predictions performed at 562 can include, for example, any of the methods discussed below. Based on the predictions generated during the first prediction stage 562, one or more further (second) predictions 564 can be generated. The predictions 564 can be predictions of resource demands for a specified event (e.g., the event for which attendance was predicted at 562A and/or that was categorized at 562C), and can be performed using, for example, any of the methods discussed below. Resource demand predictions generated at 564 can be optionally fed back to the intermediate stage for use in generating further intermediate predictions, whether for the present event or for one or more future events.

Figure 5B:
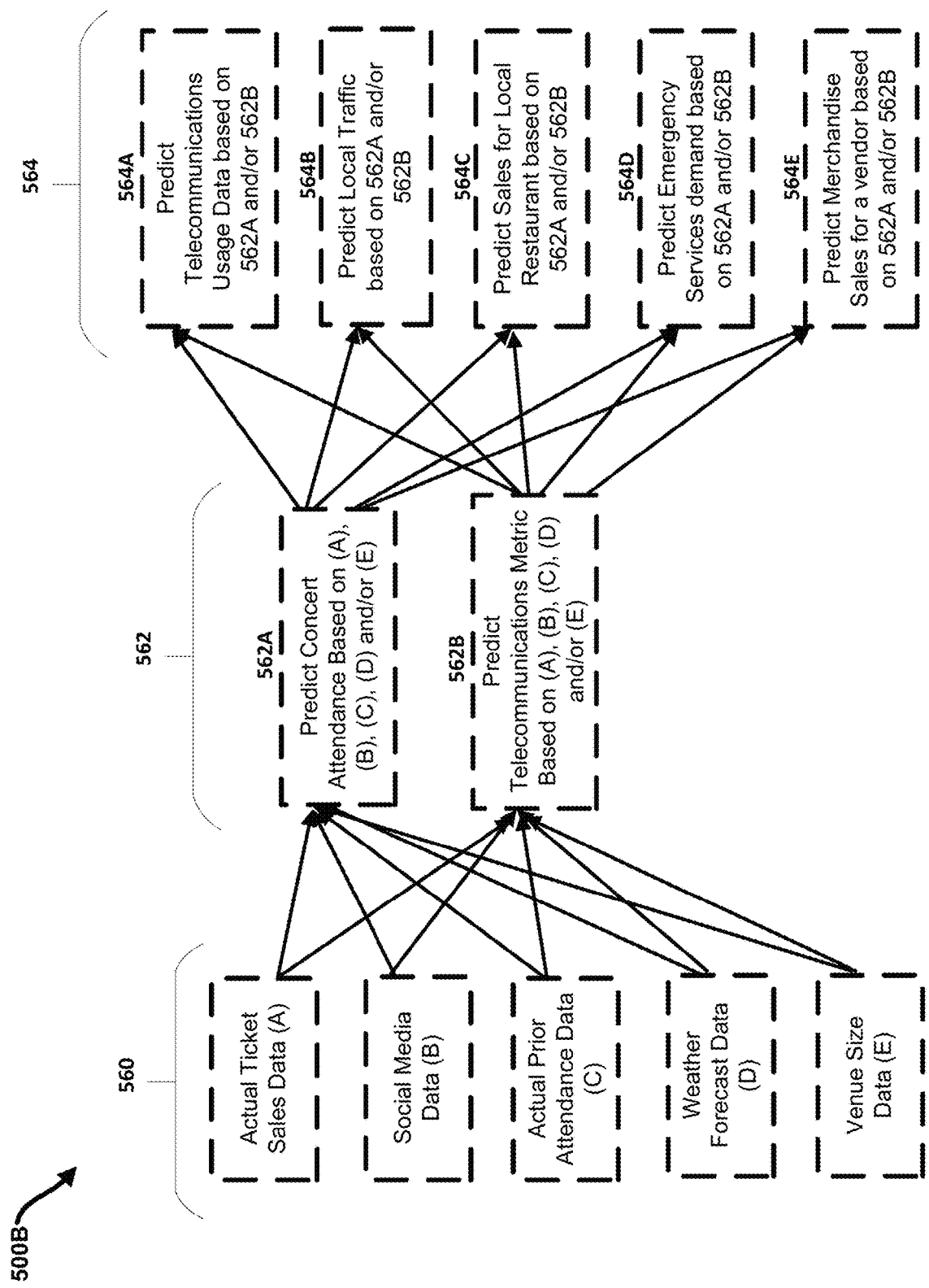
FIG. 5B is a process flow diagram showing an application of the process of FIG. 5A, according to an implementation.

FIG. 5B is a process flow diagram showing an application of the process of FIG. 5A, according to an implementation. As shown in FIG. 5B, the process 500B is predicting the impacts on various resource demands (namely telecommunications, traffic, and food/dining) associated with a concert that will be occurring at a specified location and future time. The relevant inputs received at 560 are actual ticket sales data (A) for the concert, social media data (B) associated with the concert (e.g., Twitter® tweets, Instagram posts and/or Facebook® posts about the concert, etc.), actual prior attendance data (C) for a similar concert (e.g., a prior occurrence of a named music festival), weather forecast data (D) for the date on which the concert will take place, and venue size data (E) for the venue where the concert will take place. Intermediate predictions of concert attendance (562A) and one or more telecommunications metrics (562B) associated with the concert are generated, based on one or more of the inputs received at 560, during the first prediction phase 562. Based on the prediction of concert attendance generated at 562A and/or the one or more telecommunications metrics generated at 562B, one or more of the following predictions of demand are generated during the second prediction phase 564: telecommunications usage data (564A), local traffic (564B), sales for a local restaurant (564C), emergency services (564D), and merchandise sales for a vendor (564E). Each of the predictions of demand generated during the second prediction phase 564 is associated with the concert, and thus with the geographic location and period of time associated with that concert. The predictions of demand generated during the second prediction phase 564 can be used to inform resource allocation decisions for the concert (e.g., a telecommunications provider may decide to make additional bandwidth available for that geographic region during the concert period, local traffic enforcement may staff intersections within the geographic region associated with the concert during the concert period, and/or the local restaurant may increase inventory and/or staffing during the concert period).

Time Series Sampling

In some embodiments, the sampling frequency of a signal has a significant impact on its identification. Datasets often include time series data that has been sampled at non-uniform sampling intervals, however many prediction methods are designed to process data that has been sampled at uniform partitions of time. As such, a resampling of time series data of dataset is often needed. The resampling rate can be determined by the frequency at which the predictions will be sampled by the end user of the forecast. In large-scale population volume and activity prediction, it is often the case that the signals determining population movement are sampled at much higher frequencies than the frequency at which the end user will query the forecasts. For example, telecommunications datasets provide information about the location and latency of cellular devices with an average sampling rate of seconds, or minutes, much higher than the 1-hour forecast resolution that is required for practical use.

Down-sampling aggregates the higher sampling frequency of the series to a lower frequency by aggregating a summary statistic. The mean of the higher frequencies can be used, however in other implementations, the maximum of the higher frequencies or the sum of the higher frequencies can be used.

Structure Exploration

It can be desirable, when resampling the time series, to use a sampling frequency that is high enough to capture all or most underlying signals, while assuming that a signal cannot necessarily be cleanly separated/filtered from the noise that accompanies it (e.g., including a fixed, finite sum of frequencies). In some implementations, it is assumed that the underlying statistical model parameters of the time series remain stationary through time.

Auto-Regressive Moving Average (ARMA) Model Definition

One approach to time series modeling is referred to as an Autoregressive Moving Average (ARMA) process. In ARMA modeling, a next time step of a process is generated as a linear combination of previous values and previous errors. An ARMA(p,q) process of autoregressive (AR) order p and moving average (MA) order q for a stochastic process $\{X_t\}$ is given by:

$$X_t = a + a_1 X_{t-1} + \ldots + a_p X_{t-p} + \epsilon_t + \theta_1 \epsilon_{t-1} + \ldots + \theta_q \epsilon_{t-q}$$

where $\epsilon_t \sim N(0, \sigma^2)$ are independent error/noise terms, and the "a" values are model parameters. Here we assume that $X_t$ is centered at zero by adjusting the intercept coefficient a appropriately. A more convenient way of representing this model using the backshift operator $B^p(X_t) = X_{t-p}$ is given by the following expression, in which B is a backshift operator or lag operator that operates on an element of the time-series to produce the previous element:

$$(1-a_1B-\ldots-a_pB^p)X_t=a+(1+\theta_1B+\ldots+\theta_qB^q)\epsilon_t$$

Notice that the error terms $\epsilon_i$ are unobserved. In terms of the dynamics of the model, these error terms correspond to 'corrections' in the system based on previous errors, and are responsive to shocks in the system.

Stationarity and Differencing

It is not necessarily the case that the underlying statistical model parameters of the time series remain stationary through time. A series with a steady upward trend, for example, exhibits a time-dependent mean, which can be accommodated using a differencing process (described below). Alternatively or in addition, a series may have a time-dependent variance.

The first difference of a time series $X_t$ is given by $X_t-X_{t-1}$. If $X_t$ exhibits a non-exponential upward or downward trend, then the series given by its first difference will likely not exhibit the same trend, as the differences in values are steady. If the first difference is not sufficient to introduce stationarity ("stationarity" referring to a condition in which the differences in values are steady, or that the mean and/or variance remain steady/substantially constant over time), a second difference may be implemented, however, over-differencing comes at the price of lower forecasting accuracy. If the differenced time series is forecast, the forecasts may be added to the differenced series $X_t-X_{t-1}$ to recover forecasts for $X_t$.

Autocorrelation Plots (ACF) and Partial Autocorrelation Plots (PACF)

According to the Box-Jenkins approach to automatic ARMA model selection, Autocorrelation and Partial Autocorrelation plots can be implemented to identify the appropriate AR and MA orders. A detailed theoretical exposition on the plots and their estimations is given in Chapter 3 of Shumway & Stoffer's *Time Series and Its Applications*. Example rules for the selection of AR and MA structures are summarized as follows:

- If the PACF of the differenced series displays a sharp cutoff and/or the lag–1 autocorrelation is positive—i.e., if the series appears slightly "underdifferenced"—then consider adding an AR term to the model. The lag at which the PACF cuts off is the indicated number of AR terms.
- If the ACF of the differenced series displays a sharp cutoff and/or the lag-1 autocorrelation is negative—i.e., if the series appears slightly "overdifferenced"—then consider adding an MA term to the model. The lag at which the ACF cuts off is the indicated number of MA terms.

Seasonality

Seasonality may be incorporated to the model by explicit introduction of additional seasonal terms in the linear combination. As an example, an ARMA(1,1)(1,1) model for a dataset with 24 observations per season, with seasonal autoregressive order P and seasonal moving average order M is given by:

$$(1-a_1B-\ldots-a_pB^p)(1-A_1B^{24}-\ldots-A_PB^{24P})X_t=a+$$
$$(1+\theta_1B+\ldots+\theta_qB^q)(1+\Theta_1B^{24}+\ldots+\Theta_QB^{24Q})\epsilon_t$$

Fourier Terms and Power Spectral Density

An alternative way of introducing seasonality to the model is through the insertion of a superimposed sinusoid with period corresponding to the seasonality of the model. This is especially useful in capturing multiple seasonality present in the series. We can combine the Fourier terms with an Autoregressive Integrated Moving Average (ARIMA) process via:

$$X_t = a + \sum_{i=1}^{M}\sum_{k=1}^{K_i}\left[a_i\sin\left(\frac{2\pi kt}{p_i}\right)+b_i\cos\left(\frac{2\pi kt}{p_i}\right)\right] + ARIMA$$

where there are M different seasonalities with periods $p_i$ and $K_i$ Fourier terms each. If seasonality is not evident either in the time plots or the correlation plots, then a periodogram of the power spectral density of the signal can be used to filter out the frequencies of highest 'power', which in turn can be used to fit the appropriate Fourier terms or seasonal autoregressive terms to the series to capture its seasonality.

Additional Features

Once a standard ARIMA structure has been determined, additional features can be investigated. In some instances, ARIMA does not capture all of the dynamics of the underlying process. By using error analysis, discussed below, AutoCorrelation Function (ACF)/Partial AutoCorrelation Function (PACF) plots and histograms can help identify underlying structures that ARIMA failed to capture. Root Mean Square Error (RMSE) or other measures of accuracy can be improved by the introduction of non-standard features specific to the dataset from which the series was produced, in some embodiments.

For a time series having an hourly or daily resolution, 'time of day' and 'day of week' information can prove valuable, and may be introduced to the model via one-hot encoded dummy variables. Care should be taken when one-hot encoding such variables not to introduce linear dependency among the columns. When Ordinary Least Squares (OLS) is implemented for the regression, an intercept is excluded at model specification. An example of such introduction of dummy variables for 'day of week' information is given by the following ARIMA structure plus the one-hot encoded variables representing the days of the week.

$$X_t = \sum_{i=1}^{p}a_iX_{t-i} + \sum_{i=1}^{q}\theta_i\epsilon_{t-i} + \sum_{i=1}^{7}d_iD_i + \epsilon_t$$

where $D_i$ represents the i-th day of the week and takes the value 1 if $X_t$ is in day $D_i$, and 0 otherwise. Notice that the intercept coefficient is not included in the model.

Additional features that can be taken into account are the maxima of a series and the minima of a series, as well as the sum totals, within a specified time window. When such additional features are incorporated to the model, a similar approach can be taken in the regression equation by adding additional variables whose values are piecewise determined by their intended use. For example, to incorporate the maximum of the last 30 observations in the model, we define:

$$X_t = \sum_{i=1}^{p}a_iX_{t-i} + \sum_{i=1}^{q}\theta_i\epsilon_{t-i} + b_iM_i$$

where $$M_i = \max_{t \geq T-30} X_t.$$

Care should be taken when considering additional features not to add variables that will be linearly dependent to the other inputs of the model. For example, adding the mean of the series over a specified time window as a new feature may introduce dependency since the mean is a linear combination of previous $X_t$ values that already appear in the autoregressive part of the model.

External Series

In some embodiments, the ARIMA structure and the additional features discussed above can be extracted directly from the historical values of the time series being forecast. They are incorporated into the model via the construction of a new time series that stands as a new variable in the linear combination describing the next timestep. If external information is provided in the form of a separate time series $Z_t$ with the same evenly spaced time steps as $X_t$, it can similarly be incorporated as a predictor.

Depending on the availability of the data from $Z_t$ there are three ways such a series can be used to forecast $X_t$. If the series of $Z_t$ is generated at the same time as the series of $X_t$, then the next time step of $Z_t$ is unknown, and we have the option to either use $Z_t$ as a lagged predictor via:

$$X_{t+1}=a_1 Z_t+\text{ARMA+additional features}$$

or we can forecast $Z_t$ and use the forecasted value via:

$$X_{t+1}=a_1 F(Z_t)+\text{ARMA+additional features}$$

where $F(Z_t)$ is the forecasted value for $Z_{t+1}$. Alternatively, if $Z_t$ is available beyond the time step we are forecasting $X_t$ for, then we can directly substitute the next time step in the model:

$$X_{t+1}=a_1 Z_{t+1}+\text{ARMA+additional features}$$

At this stage, a regression or a maximum likelihood estimate can be implemented to fit the model to the data.

External Series—Use Case

In some embodiments, a knowledge base on population movement includes data from a wide range of sources, including but not limited to:
 a) Event data, e.g., organized and pre-planned events such as sporting events, concerts, conferences, exhibitions etc.
 b) Historical data on locations of persistent population concentration and interest, e.g., bars, cafés, clubs, hospitals, train stations, etc.
 c) Predictive data relevant to population movement, e.g., weather forecasts and historical traffic reports.
 d) Live data, e.g., social media data and data associated with transportation service emergencies.
 e) Static data, e.g., a number of businesses, venue capacity and demographics Using this information, absolute and relative measures of population volume can be determined. For example, event data sources (a) can be combined with venue capacity information from static data (e) to generate a population volume series $V_t$ for any locality at time t.

Further, data from locations of interest (b) provide normalized historical averages, maxima and minima of attendance at bars, cafés, restaurants and other points of interest throughout a locality, which combined with venue capacity information can also provide a relativized population volume series $\nabla_t$. A normalization, re-factoring and appropriate re-sampling step allows absolute population volume estimates $V_t$ to be combined with relative population volume estimates $\nabla_t$ to generate comprehensive population volume estimates $Z_t$ over time.

As described in the previous section, this time series $Z_t$ can be used as a significant predictor in any process that is correlated with population volume (e.g., crime frequency and volume, mobile telecommunication latency, etc.). To generate models for a process that is causal or correlated with population volume, analysis of the internal structure of the process as set forth herein can be combined with appropriately normalized and localized population volume time series in a scheme that can be roughly described via:

$$X_t=\text{Population Series+ARIMA+Additional internal features+Fourier terms}$$

Hypothesis (Setting Model Hyperparameters)

In some embodiments, the steps undertaken in structure exploration as described herein are used to create a hypothesis about the underlying dynamics guiding/driving the time series. If there is an autoregressive or moving average structure, the appropriate ARMA orders can be specified and included in the model. If there is a critical saturation level that the series may reach, then the sum totals over a fixed time window may be included. If a clear seasonal component is present, a Fourier term can be introduced to fit it appropriately.

It should be noted that the feature selection/extraction process and the model hypothesis can be implemented in an iterated fashion. For example, domain knowledge can be used to form a model hypothesis that informs a feature selection process. Alternatively, a statistically-driven feature selection and error analysis can be used to generate a hypothesis.

A model can be defined as a linear combination of the underlying parameters, represented in vector form by:

$$y=Xb$$

where X is a matrix of observations (rows) for each of the variables in our model (columns), with target variables (observations) y, and coefficients b to be estimated from the observations.

Forecasting

Estimation

In some embodiments, a baseline approach for coefficient estimation is an OLS estimate for the minimization problem, as follows:

$$b=\text{argmin}\|y-Xb\|$$

A linear regression in Python's scikit-learn can be implemented for the task of minimizing the errors $\|y-Xb\|$. This yields a baseline root mean squared error (RMSE), mean average percentage error (MAPE), mean average square error (MASE), R2 and Akaike Information Criterion (AIC_C) scores.

Two techniques for linear regression are implemented Ordinary Least Squares (OLS) and Decision Trees, which may be sufficient for most tasks. In some implementations, however, if it is desirable to add Moving Average terms, unobserved error terms may be added to the linear combination of the model. Since these terms are unobserved, a Maximum Likelihood Estimate may be implemented. Statsmodels' ARMA function provides ARMA models with maximum likelihood estimation (MLE) implementations for moving average terms.

Regression estimates that improve on OLS include Ridge and Lasso Regression. These may similarly be implemented via scikit-learn's Regression library. An alternative estimator for the same underlying linear combination model is a decision tree. As shown via the implemented examples below, the two estimates yield very similar results, with OLS having a slight advantage. Decision trees, however, offer greater flexibility in the form of random forests and gradient boosting. Decision Tree Ensembles, such as the xgboost algorithm have gained popularity through their successful use in forecasting competitions, along with built-in implementations in the Python ecosystem.

Training/Test Splits

A traditional train and test set split was used for the training and evaluation of the model. The time-dependence of the data did not permit the use of a fully-fledged cross-validation schema, however, a slight improvement on standard train/test splits is given by the following folding structure, in which a time series is divided into six parts [1], . . . , [6], as follows:

Fold 1: train [1] - test [2]
Fold 2: train [1], [2] - test [3]
.
.
Fold 5: train [1], ..., [4] - test [5]

Single-Step

Models can be compared, for example, on the basis of their single-step forecasting accuracy. In other words, for every point in a test set, a single-point forecast is produced. The residuals resulting from this single-step prediction can be used to produce RMSE, MAPE and AIC_C scores, which form the foundation for cross-model comparison.

Multi-Step

In some applications, multi-step forecasts are desired. A regression model may be equipped to predict only a single step in the future based on historical values, however if multiple future values are desired, an iterated approach can be taken, in which each prediction is taken as a ground truth and used along with previous historical values to generate a new prediction for the following time step. The model can optionally be re-fit based on this new prediction value.

Error Analysis

Residuals

In some embodiments, the residuals of a model that sufficiently captures the dynamics of a process are preferably normally distributed and centered at zero. Further, the autocorrelation and partial autocorrelation plots of the residuals preferably show no significant AR or MA structure. That is, it is preferred that there be limited or no linear dependence between consecutive residuals, and no seasonal pattern to their occurrence.

If the data is normally distributed but not centered at zero, there may be bias or other unexplained error structure(s) in the model that skews the outputs consistently above or below center. A solution to this skew can include fitting an ARMA model to the residual series based on any AR or MA signatures we see in the residuals' ACF and PACF plots Error Metrics Different types of error measurement can be used, depending for example on the desired accuracy of the predictions. For example, the following metrics can be employed on the test set:
  a) Root Mean Squared Error (RMSE)—the standard Euclidean distance of a vector from zero. This distance is biased towards outliers resulting from squaring. The square root is applied to make the units of the errors same as the units of the observations. This may be preferred when measuring the average number of units that differentiate the forecasts from associated real observations. The root may be omitted when the objective is only to minimize this error.
  b) Mean Absolute Percentage Error (MAPE)—an average of the percentage by which each prediction misses its corresponding observation. This is a direct way of retrieving a percentage of the forecasting accuracy.
  c) Mean Absolute Scaled Error (MASE)—the average of the ratios of absolute forecast errors against the mean absolute error of a naïve forecast. A naïve forecast may be defined as a forecast that uses the previous time step as a forecast for the next time step. If this metric is less than 1, then the model is out-performing the naïve forecast.

All combinations of the foregoing concepts and additional concepts discussed herewithin (provided such concepts are not mutually inconsistent) are contemplated as being part of the subject matter disclosed herein. The terminology explicitly employed herein that also may appear in any disclosure incorporated by reference should be accorded a meaning most consistent with the particular concepts disclosed herein.

The skilled artisan will understand that the drawings primarily are for illustrative purposes, and are not intended to limit the scope of the subject matter described herein. The drawings are not necessarily to scale; in some instances, various aspects of the subject matter disclosed herein may be shown exaggerated or enlarged in the drawings to facilitate an understanding of different features. In the drawings, like reference characters generally refer to like features (e.g., functionally similar and/or structurally similar elements).

The term "automatically" is used herein to modify actions that occur without direct input or prompting by an external source such as a user. Automatically occurring actions can occur periodically, sporadically, in response to a detected event (e.g., a user logging in), or according to a predetermined schedule.

The term "determining" encompasses a wide variety of actions and, therefore, "determining" can include calculating, computing, processing, deriving, investigating, looking up (e.g., looking up in a table, a database or another data structure), ascertaining and the like. Also, "determining" can include receiving (e.g., receiving information), accessing (e.g., accessing data in a memory) and the like. Also, "determining" can include resolving, selecting, choosing, establishing and the like.

The phrase "based on" does not mean "based only on," unless expressly specified otherwise. In other words, the phrase "based on" describes both "based only on" and "based at least on."

The term "processor" should be interpreted broadly to encompass a general purpose processor, a central processing unit (CPU), a microprocessor, a digital signal processor (DSP), a controller, a microcontroller, a state machine and so forth. Under some circumstances, a "processor" may refer to an application specific integrated circuit (ASIC), a programmable logic device (PLD), a field programmable gate array (FPGA), etc. The term "processor" may refer to a combination of processing devices, e.g., a combination of a DSP and a microprocessor, a plurality of microprocessors, one or more microprocessors in conjunction with a DSP core or any other such configuration.

The term "memory" should be interpreted broadly to encompass any electronic component capable of storing electronic information. The term memory may refer to various types of processor-readable media such as random access memory (RAM), read-only memory (ROM), non-volatile random access memory (NVRAM), programmable read-only memory (PROM), erasable programmable read only memory (EPROM), electrically erasable PROM (EEPROM), flash memory, magnetic or optical data storage, registers, etc. Memory is said to be in electronic communication with a processor if the processor can read information from and/or write information to the memory. Memory that is integral to a processor is in electronic communication with the processor.

The terms "instructions" and "code" should be interpreted broadly to include any type of computer-readable statement(s). For example, the terms "instructions" and "code" may refer to one or more programs, routines, subroutines, functions, procedures, etc. "Instructions" and "code" may comprise a single computer-readable statement or many computer-readable statements.

Some embodiments described herein relate to a computer storage product with a non-transitory computer-readable medium (also can be referred to as a non-transitory processor-readable medium) having instructions or computer code thereon for performing various computer-implemented operations. The computer-readable medium (or processor-readable medium) is non-transitory in the sense that it does not include transitory propagating signals per se (e.g., a propagating electromagnetic wave carrying information on a transmission medium such as space or a cable). The media and computer code (also can be referred to as code) may be those designed and constructed for the specific purpose or purposes. Examples of non-transitory computer-readable media include, but are not limited to, magnetic storage media such as hard disks, floppy disks, and magnetic tape; optical storage media such as Compact Disc/Digital Video Discs (CD/DVDs), Compact Disc-Read Only Memories (CD-ROMs), and holographic devices; magneto-optical storage media such as optical disks; carrier wave signal processing modules; and hardware devices that are specially configured to store and execute program code, such as Application-Specific Integrated Circuits (ASICs), Programmable Logic Devices (PLDs), Read-Only Memory (ROM) and Random-Access Memory (RAM) devices. Other embodiments described herein relate to a computer program product, which can include, for example, the instructions and/or computer code discussed herein.

Some embodiments and/or methods described herein can be performed by software (executed on hardware), hardware, or a combination thereof. Hardware modules may include, for example, a general-purpose processor, a field programmable gate array (FPGA), and/or an application specific integrated circuit (ASIC). Software modules (executed on hardware) can be expressed in a variety of software languages (e.g., computer code), including Python, C, C++, Java™, Ruby, Visual Basic™, and/or other object-oriented, procedural, or other programming language and development tools. Examples of computer code include, but are not limited to, micro-code or micro-instructions, machine instructions, such as produced by a compiler, code used to produce a web service, and files containing higher-level instructions that are executed by a computer using an interpreter. For example, embodiments may be implemented using imperative programming languages (e.g., C, Fortran, etc.), functional programming languages (Haskell, Erlang, etc.), logical programming languages (e.g., Prolog), object-oriented programming languages (e.g., Java, C++, etc.) or other suitable programming languages and/or development tools. Additional examples of computer code include, but are not limited to, control signals, encrypted code, and compressed code.

Various concepts may be embodied as one or more methods, of which at least one example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments. Put differently, it is to be understood that such features may not necessarily be limited to a particular order of execution, but rather, any number of threads, processes, services, servers, and/or the like that may execute serially, asynchronously, concurrently, in parallel, simultaneously, synchronously, and/or the like in a manner consistent with the disclosure. As such, some of these features may be mutually contradictory, in that they cannot be simultaneously present in a single embodiment. Similarly, some features are applicable to one aspect of the innovations, and inapplicable to others.

The indefinite articles "a" and "an," as used herein in the specification and in the embodiments, unless clearly indicated to the contrary, should be understood to mean "at least one."

The phrase "and/or," as used herein in the specification and in the embodiments, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used herein in the specification and in the embodiments, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the embodiments, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of," or "exactly one of." "Consisting essentially of," when used in the embodiments, shall have its ordinary meaning as used in the field of patent law.

In the embodiments, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures, Section 2111.03.

While specific embodiments of the present disclosure have been outlined above, many alternatives, modifications, and variations will be apparent to those skilled in the art. Accordingly, the embodiments set forth herein are intended to be illustrative, not limiting. Various changes may be made without departing from the spirit and scope of the disclosure.

The invention claimed is:

1. A method, comprising:
generating a first domain-specific machine learning algorithm, for a first domain, the generating the first domain-specific machine learning algorithm including at least one of time series sampling, time series resampling, or an introduction of seasonal terms to a time series;
receiving, via a processor, site data for each geographic area of a plurality of geographic areas, the plurality of geographic areas including a cellular base station, the site data including at least one of: property layout data, facility type data, facility size data, facility usage data, or maximum site occupancy data;
receiving, via one of a graphical user interface (GUI) or an application programming interface (API): (1) an indication of a first geographic area of the plurality of geographic areas and (2) an indication of a first time interval of a plurality of time intervals;
generating, via the processor and for the first geographic area and for the first time interval, predicted occupancy data using the first domain-specific machine learning algorithm;
generating a second domain-specific machine learning algorithm, for a second domain different from the first domain; and
determining, via the processor and based on the predicted occupancy data and using the second domain-specific machine learning algorithm, a predicted telecommunications network metric for at least one geographic area from the plurality of geographic areas and for a time interval from the plurality of time intervals, the predicted telecommunications network metric including one of total telecommunications network traffic volume for a predetermined time interval, telecommunications network traffic type, telecommunications network traffic volume per unit time, or telecommunications network latency distribution for a predetermined time interval.

2. The method of claim 1, further comprising generating, via the processor and for each geographic area of the plurality of geographic areas and for each time interval of a plurality of time intervals, predicted activity category data,
wherein the determining the predicted telecommunications network metric is further based on the predicted activity category data.

3. The method of claim 1, further comprising:
sending, in response to receiving the indication of the first geographic area of the plurality of geographic areas and the indication of the first time interval of the plurality of time intervals, a signal to cause at least one of: display within the GUI of the predicted telecommunications network metric associated with the first geographic area and the first time interval, delivery of the predicted telecommunications network metric associated with the first geographic area and the first time interval via the API, or delivery of the predicted telecommunications network metric associated with the first geographic area and the first time interval via an associated CSV file.

4. The method of claim 1, wherein the generating the predicted occupancy data is based on the site data, weather data, event data, and population demographic data.

5. The method of claim 1, wherein the site data includes site occupancy capacity data.

6. The method of claim 1, wherein the generating the predicted occupancy data includes an autoregressive moving average process.

7. The method of claim 1, wherein the generating the predicted occupancy data is performed using time series modeling.

8. The method of claim 1, further comprising receiving at least one of: event data, historical data, predictive data, live data, or static data for the plurality of geographic areas,
the generating the predicted occupancy data being based on the at least one of event data, historical data, predictive data, live data, or static data.

9. The method of claim 1, further comprising sending a signal to cause at least one of: display of the predicted telecommunications network metrics within the GUI, delivery of the predicted telecommunications network metrics via the API, or delivery of the predicted telecommunications network metrics via a comma-separated values (CSV) file.

10. The method of claim 1, wherein the receiving the site data is via at least one of the GUI, the API, or a CSV file.

* * * * *